United States Patent [19]

Egli

[11] Patent Number: 4,705,072
[45] Date of Patent: Nov. 10, 1987

[54] SINGLE-LEVER MIXING FIXTURE
[75] Inventor: Werner Egli, Eglisau, Switzerland
[73] Assignee: Armaturenfabrik Wallisellen AG, Wallisellen, Switzerland
[21] Appl. No.: 11,565
[22] Filed: Feb. 6, 1987
[30] Foreign Application Priority Data Feb. 7, 1986 [CH] Switzerland ............................. 497/86

[51] Int. Cl.$^4$ ............................................. F16K 11/078
[52] U.S. Cl. .............................. 137/625.17; 137/625.4; 137/636.2; 137/636.3; 251/285
[58] Field of Search ........... 137/625.17, 625.4, 625.41, 137/636, 636.2, 636.3; 251/285

[56] References Cited

U.S. PATENT DOCUMENTS

| 3,433,264 | 3/1969 | Parkison | 137/625.17 |
| 3,678,961 | 7/1972 | Grosche | 137/636.2 |
| 3,891,005 | 6/1975 | Manoogian et al. | 137/625.4 |
| 3,964,515 | 6/1976 | Manoogian et al. | 137/625.17 |
| 4,387,880 | 6/1983 | Saarisalo et al. | 251/285 |

FOREIGN PATENT DOCUMENTS 2815990 10/1979 Fed. Rep. of Germany ... 137/625.4
3202392 8/1983 Fed. Rep. of Germany ... 137/625.4
3219574 12/1983 Fed. Rep. of Germany .

Primary Examiner—Alan Cohan
Assistant Examiner—John Rivell
Attorney, Agent, or Firm—Sughrue, Mion, Zinn, Macpeak and Seas

[57] ABSTRACT

In a mixing valve having a stationary ceramic disc 22 and a movable control disc 20, a control shaft 5 is arranged in a radial through bore 46 in a guide part 43 rotatably mounted in a housing 32. A control pin 15 is inserted through a central bore in the control shaft, and its spherical lower end engages a socket 17 of a connecting piece 18 rigid with the control disc. Sleeves 7 having flanged outer ends configured for the attachment of an operating yoke 3 are mounted on both ends of the control shaft by means of mating axial serrations. The position of the yoke can be adjusted by varying the position of the sleeves. Only one rotating element is employed whose bearing parts are not subject to wear since only very small rotary angles are necessary, and the rotary force is transmitted from the yoke to such element over the entire length of the control shaft.

10 Claims, 6 Drawing Figures

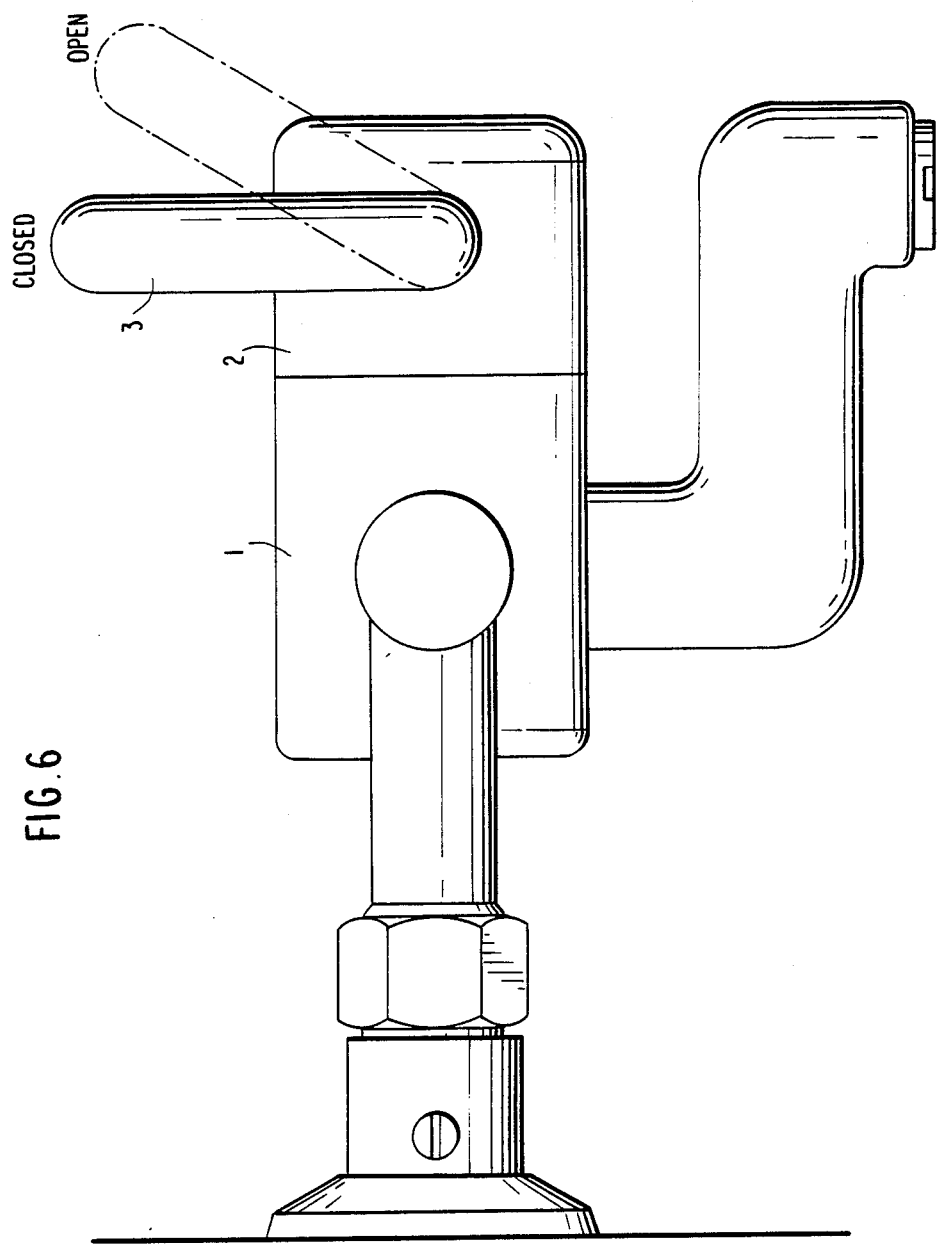

SINGLE-LEVER MIXING FIXTURE

BACKGROUND OF THE INVENTION

This invention relates to an actuating arrangement in a single-lever mixing fixture or faucet of the combined volume and proportion control type.

In modern valves of this type the rate of flow is regulated by means of ground ceramic discs, wherein a first disc being mounted in stationary manner in a housing and a second disc being arranged in at least a rotationally movable manner as a control disc and rigidly connected to the actuating member.

According to U.S. Pat. No. 3,433,264 it is known to use such ceramic discs for mixing fixtures. The fixed disc has three axial through bores, one for the inflow of cold water, one for the inflow of hot water and one for the discharge of the mixed water. The control disc has only one connecting recess, which can be continuous, and this recess features a control edge so disposed that, by the rotation of the control disc, the two inflow bores can be opened or closed in a complementary manner in order to thus adjust the mixing ratio from cold to hot water. By a translatory displacement of the control edge, such that it is displaced parallel to itself, the rates of flow can be adjusted at the same mixing ratio.

In such mixer taps there is a problem in making both adjustments with only one actuating member. In German Patent No. 3,219,574 it is proposed to provide an eccentric bearing body centrally disposed in the outer sleeve of the control insert and engaged in a longitudinal groove in a thrust piece or in the control disc itself. On its other side this body is in operative connection with an arm of a bell-crank lever actuated by the operating lever. The control disc is rotated by turning the operating lever about the axis of the control insert to thus adjust the mixing ratio, and the control disc is displaced in a translatory manner in the adjusted rotary position by pivoting the operating lever up and down.

A simplification with respect to the transmission of movement from the lever to the control disc is described in German Patent No. 3,202,392. A rotatable neck part which has a two-piece pivoting part inserted in a transverse bore is available in the control insert. The pivoting part is connected non-rotationally to the lever and, by means of engagement fingers, formed in one piece on each pivoting part, in engagement openings in a guide part mounted non-rotationally and non-displaceably on the control disc, transmits the rotary and lifting movement to the control disc. A disadvantage is the rotary mounting of the neck part by means of an L-shaped snap ring, engaging from outside. On account of its large diameter correspondingly large frictional forces result, which after wear can make fine regulation impossible. It must be possible for the rotary and displacement movements, which are transmitted by the two engagement fingers from the lever to the guide part, to be accurately executed in an adjustable manner free from play, which after some time can lead to difficulties as a result of the twofold friction with the two engagement fingers. In addition, the two pivoting parts still bear axially against the cartridge housing and produce a further friction spot.

Moreover, the position of the operating lever is predetermined in both of the previously mentioned German patents. It is only possible to preset the maximum temperature and/or the maximum rate of flow by dismantling the cartridge or at least the operating members, because the sensitive articulated joints and friction surfaces must not be accessible to everyone.

SUMMARY OF THE INVENTION

It is therefore an object of this invention to provide an actuating arrangement in which, apart from the articulated connection with the control disc, no further articulated joints are required. This makes the temperature adjustment accessible. Moreover, the operating lever is adjustable in its angular position with respect to the cartridge.

BRIEF DESCRIPTION OF THE DRAWINGS

FIG. 6 shows a view identical to FIG. 5 but of a wall mixer.

DETAILED DESCRIPTION OF THE PREFERRED EMBODIMENTS

Figure 1:
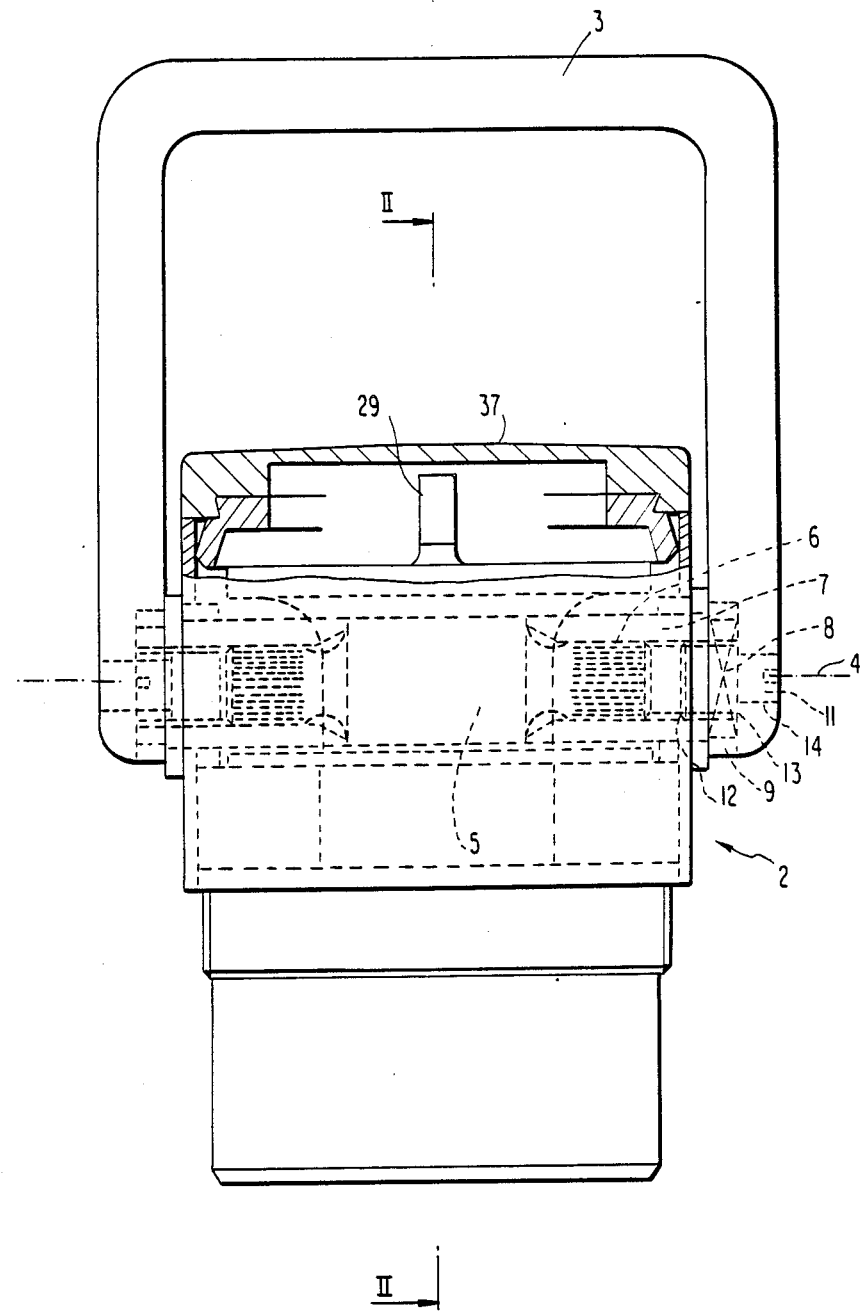
FIG. 1 shows a front view of a control cartridge for a mixer valve according to the invention.
Figure 2:
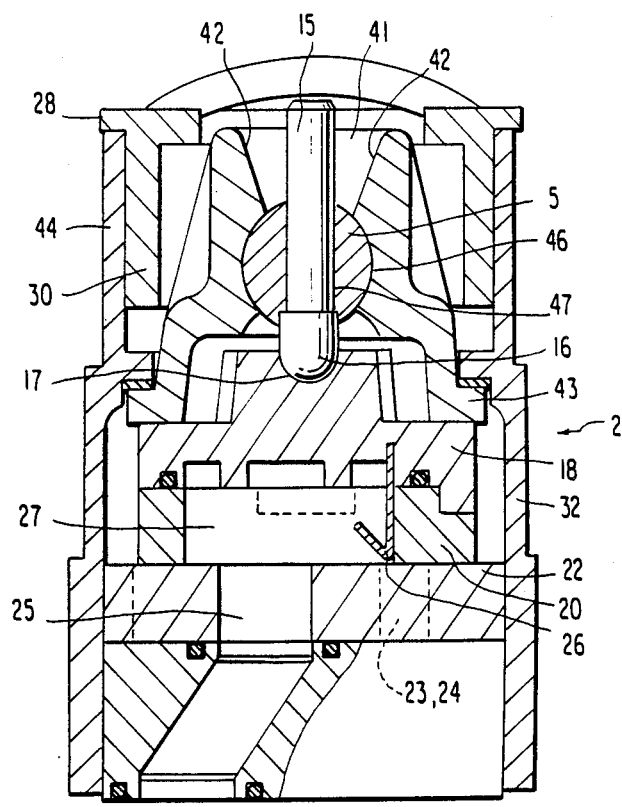
FIG. 2 shows a sectional view along line II—II in FIG. 1.
Figure 5:
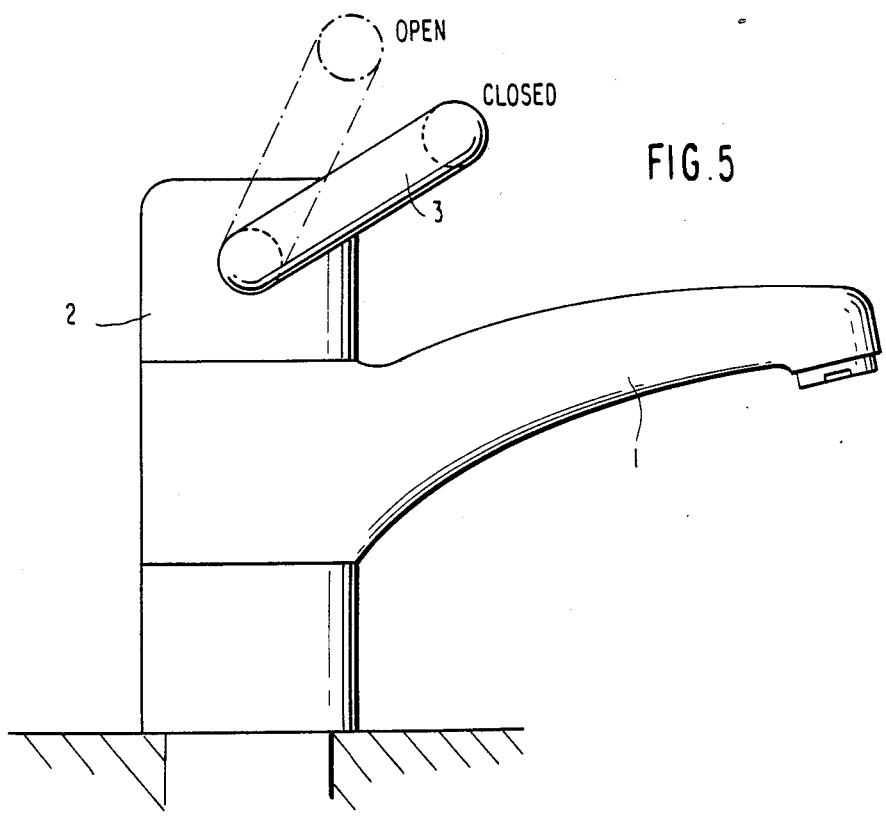
FIG. 5 shows a view of a pillar mixer from the side.

FIGS. 1 and 2 show a cartridge 2 for a mixer valve. The housing 1 can be designed for a wall mixer according to FIG. 6 or for a pillar mixer according to FIG. 5. The same cartridge is installed in both cases. A yoke 3 spanning the cartridge serves as the actuating lever, and can be pivoted about the axis 4 of a control shaft 5.

The control shaft is disposed in a radial through bore 46 of a guide part 43 rotatably inserted into the cartridge housing 32, and extends out at least as far as the circumference of the housing. A control pin 15 is located in a radial control bore 47 disposed approximately centrally in the control shaft 5, one end of the control pin being shaped as a spherical segment 16 and engaging in a socket 17 in a connecting piece 18.

The other end of the control pin 15 is located in a slotlike recess 41 having two stop faces 42 on opposite sides of the pivot path. The connecting piece 18 is in turn connected to the movable control disc 20 in a rotationally and displaceably rigid manner. This can be effected, for example, by means of three cogs arranged on the periphery of the connecting piece and engaging corresponding recesses in the control disc 20. Thus, both the rotary movement for the complementary adjustment of the openings 23 and 24 for cold and hot water in the stationary disc 22, and also the parallel displacement for enlarging or reducing the outlet areas of the two openings, are transmitted free from play so that the desired quantity of water at the desired temperature can be obtained at the outlet opening 25 in the stationary disc 22.

As mentioned above, the ends of the control shaft 5 lie in the area of the circumference of the housing 32 and have axial serrations 6. Slip-on sleeves 7 with mating serrations are fitted over the ends of the control shaft. On the outside, the sleeves 7 have a flange which is provided with two parallel surfaces 8 as guide cogs for grooves 9 in the operating yoke 3. Screws 11 are screwed from the outside into the sleeve bases 12. By unscrewing the screws 11, their heads each project into a bore 14 in the operating yoke 3 which therefore cannot be removed. Not until the screws are screwed in and therefore their heads no longer project into the bore 14 can the operating yoke 3 be removed.

If the sleeves 7 are then removed they can be reinstalled in another relative position back onto the control shaft 5; this can be effected in steps defined by the spacing of the serrations. This changes the relative position of the surfaces 8 to the axis of the control pin 15 and therefore to the housing 32, and this relative position in turn results in another position of the operating yoke with respect to the housing.

Figure 3:
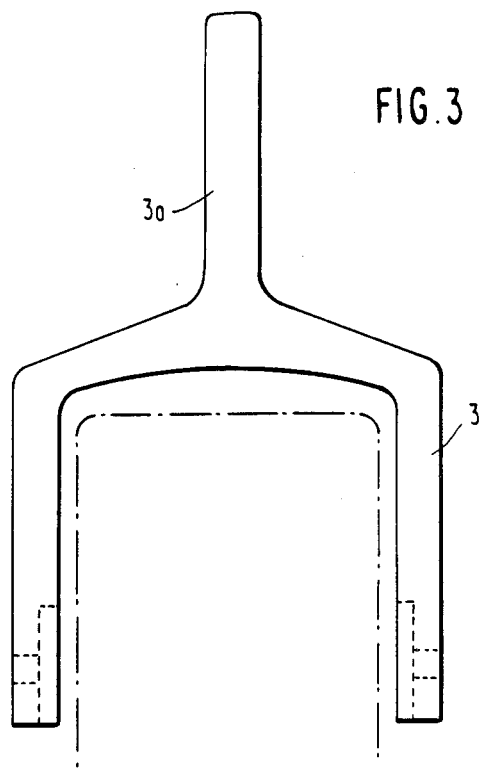
FIG. 3 shows a view of another embodiment of the operating lever.

Whereas in FIGS. 1 and 2 a plain U-shaped yoke 3 is provided for operating the faucet, a short lever arm 3a as shown in FIG. 3 can be attached to the yoke 3 if desired for reasons of user comfort and convenience. With the described embodiment of yoke attachment, a yoke can of course also be interchanged just as easily as its position with respect to the housing can be adjusted.

Figure 4:
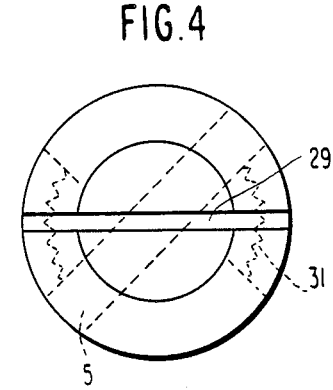
FIG. 4 shows a plan view of a rotary angle limiter with the cap removed.

For adjusting the rotary angle of the guide part 43 inside the housing 32, the housing has two diagonally opposite axial lugs 44 (FIG. 2). An insertion element 28 is likewise provided with two limiting parts 30 arranged diagonally opposite one another. Both the lugs 44 and the limiting parts 30 are provided with axial serrations 31 (FIG. 4) on their contacting surfaces such that by appropriately placing the insertion element 28 onto the lugs 44, the intermediate space between the lugs can be reduced by the limiting parts 30. As a result the free rotary angle for the ends of the control shaft 5 and thus the control disc 20 can be set as required in order to limit the temperature range for the mixed water.

With the upper end of the control pin 15 lying in the recess 41, the rate of flow may also be reduced by changing the spacing of the stop faces 42 by means of an insertion part. Since both the insertion element 28 and such an insertion part are accessible from above, it is sufficient for the cap 37 to be of a removable configuration to serve as a closure for the opening in the housing 1.

What is claimed is:

1. A single-lever mixing fixture, comprising:
   (a) a solid disc (22) stationarily disposed in a housing (32),
   (b) a plurality of through openings (23,24,25) defined in said disc for the inflow of cold and hot water and for the discharge of mixed water,
   (c) a control disc (20) rotatable and laterally displaceable relative to the solid disc and disposed in sliding engagement therewith,
   (d) a control edge (26) defined at a recess (27) in the control disc, said recess serving to connect the through openings,
   (e) a connecting piece (18) for transmitting rotary and lateral displacement movement from an actuating member (3) to the control disc (20),
   (f) a radial through bore (46) in a guide member (43) for accommodating a control shaft (5) for pivoting the control disc (20) via the connecting piece by means of a control pin (15), said guide member being rotatably disposed in the housing,
   (g) the control shaft being cylindrically formed and having opposite ends projecting outwardly at least as far as the circumference of the housing,
   (h) the control pin being inserted rigidly through a radial bore (47) in the control shaft,
   (i) the connecting piece (18) being in rotationally rigid engagement with the guide member (43) for transmitting the rotary movement and in radially displaceable engagement with the guide member for transmitting the lateral displacement movement, and
   (j) a recess (17) defined in the connecting piece for engagement with one end of the control pin (15).

2. A fixture according to claim 1, wherein the actuating member is a yoke (3) connected rigidly on both sides thereof to the ends of the control shaft (5).

3. A fixture according to claim 2, wherein the rigid connection between the yoke and the control shaft comprises mating axial serrations (6) between sleeves (7) mounted on the control shaft, and the control shaft.

4. A fixture according to claim 3, wherein the sleeves (7) are provided with outer end surfaces (8) parallel to one another, and the ends of the yoke are each provided with a groove (9) for receiving said surfaces (8).

5. A fixture according to claim 4, wherein, for connecting the sleeves (7) and the yoke (3) together, screws (11) are provided which, when partially unthreaded, engage in bores (14) in the yoke (3).

6. A fixture according to claim 1, wherein said one end of the control pin (15) defines a spherical segment (16), and the recess in the connecting piece (18) is configured as a corresponding socket (17).

7. A fixture according to claim 6, wherein, to limit the lateral displacement movement, another, opposite end of the control pin (15) extends beyond the control shaft (5), and a slot-like recess (41) having two stop faces (42) is defined in the guide member (43).

8. A fixture according to claim 7, wherein, to limit the rotary movement, two axial lugs (44) having internal serrations are integrally formed on the housing (32), and an insertion element (28) having two axial limiting parts (30) with external serrations is provided such that the pivoting range of the control shaft (5) can be adjusted by the selected overlapping of the lugs and the limiting parts.

9. A fixture according to claim 8, wherein the housing (32) is closed with a lid (37) inserted axially over an upper portion of the housing, and the insertion element (28) is freely accessible after removal of said lid.

10. A fixture according to claim 1, wherein the housing (32) is designed as a cartridge in which all valve parts (20,22) and their control means (5,15,18,43) are mounted.

* * * * *